United States Patent [19]

Mathis et al.

[11] 4,435,221

[45] Mar. 6, 1984

[54] PROCESS FOR CLEANING METAL SURFACES OF POLY(ARYLENE SULFIDE) DEPOSITS

[75] Inventors: Ronald D. Mathis; Jerry O. Reed, both of Bartlesville, Okla.

[73] Assignee: Phillips Petroleum Company, Bartlesville, Okla.

[21] Appl. No.: 403,434

[22] Filed: Jul. 30, 1982

[51] Int. Cl.$^3$ ................................................ C23G 5/02
[52] U.S. Cl. ........................................ 134/2; 134/3; 524/371
[58] Field of Search ............... 134/28, 30, 41, 38, 134/3, 2; 524/371; 252/174.23

[56] References Cited

U.S. PATENT DOCUMENTS 4,032,362 6/1977 Edelman ............................ 134/48

FOREIGN PATENT DOCUMENTS 58-03615 1/1983 Japan.

OTHER PUBLICATIONS

*Encyclopedia of Chemical Technology*, Kirk–Othmer, vol. 18, 3rd Edition, p. 426.

*Primary Examiner*—S. Leon Bashore, Jr.
*Assistant Examiner*—Karen M. Hastings

[57] ABSTRACT

A process for the removal of poly(arylene sulfide) deposits is provided which comprises contacting said deposits with a solution comprising an alkali metal hydrosulfide in a lactam. In addition, a process for the cleaning of metal parts having poly(arylene sulfide) deposits is provided by contacting the metal parts in the manner as described immediately above, contacting the metal part with a lower alkyl alcohol, washing said metal part with water, drying said metal part, contacting the dried part with concentrated $HNO_3$ followed by water washing and drying.

10 Claims, No Drawings

PROCESS FOR CLEANING METAL SURFACES OF POLY(ARYLENE SULFIDE) DEPOSITS

This invention relates to a process for cleaning metal surfaces containing poly(arylene sulfide) based deposits. In addition, this invention relates to a process for cleaning metal surfaces to remove not only poly(arylene sulfide) deposits but other contaminants as well.

In the production of poly(arylene sulfide) polymers various impurities such as polymer gel and inorganic materials are sometimes present in the polymer and can deposit on the surfaces of the production equipment. In addition, deposits derived from the polymer can also form during subsequent processing of the polymer, such as in synthetic fiber production. Thus the machine parts utilized in processing the produced polymer which have poly(arylene sulfide) deposits and/or other impurities must be cleaned for re-use. Such parts include spinnerettes, dies, pack parts, and filters.

In the past such poly(arylene sulfide) deposits have been removed mechanically, but the job is tedious and time consuming due to the complexity of the equipment. Also, attempts to remove such deposits by "burn out" procedures where the metal parts containing such deposits are placed in a forced air furnace and extreme heat applied, have been made. However, this "burn out" procedure is not suitable for removing deposits from metal surfaces since the burn out caused corrosion on the metal surface. Therefore, a process which will readily remove such deposits without having a corrosive or other deleterious effect on processing equipment is desirable.

In addition to the poly(arylene sulfide) deposits, contaminants present in the polymer such as metal oxides and calcium and magnesium salts are often deposited on the metal surfaces. Their removal is also desirable in order to give a clean metal surface.

It is therefore an object of this invention to provide a process for removing deposits on metal surfaces derived from poly(arylene sulfides). It is a further object of this invention to provide a process for the cleaning of metal parts having poly(arylene sulfide) deposits thereon.

Other aspects, objects, and the several advantages of the present invention will become apparent from this specification and the claims.

In accordance with the present invention, we have discovered that poly(arylene sulfide) deposits on metal surfaces may be removed by contacting said deposits with a solution consisting essentially of at least one Group IA alkali metal hydrosulfide in a lactam of the general formula

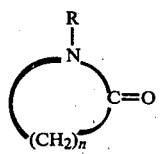

where R is hydrogen or an alkyl radical having from 1 to 5 carbon atoms and n is an integer from 5 to 7 at a temperature and for a time sufficient to remove said deposits.

In accordance with another embodiment of the present invention, we have discovered that metal parts having poly(arylene sulfide) deposits may be cleaned by contacting said deposits with a solution consisting essentially of an alkali metal hydrosulfide in a lactam as described in the first embodiment of the present invention, thereafter contacting the metal part with a lower alkyl alcohol, washing the metal part with water, drying the metal part, and thereafter contacting the dried part with concentrated nitric acid.

The term "poly(arylene sulfide) polymer" as used in this specification is intended to include polymers of the type which are prepared as described in U.S. Pat. Nos. 3,354,129 and 3,919,177. As disclosed in U.S. Pat. No. 3,354,129, these polymers can be prepared by reacting a polyhalo-substituted cyclic compound containing unsaturation between adjacent ring atoms and an alkali metal sulfide in a polar organic compound. The resulting polymer contains the cyclic structure of the polyhalo-substituted compound coupled in repeating units through a sulfur atom. The polymers which are preferred for use in this invention are those polymers having the repeating unit —R—S— where R is phenylene, biphenylene, naphthylene, biphenylene ether, or a lower alkyl-substituted derivative thereof. By "lower alkyl" is meant alkyl groups having one to six carbon atoms such as methyl, propyl, isobutyl, n-hexyl, etc. Polymer can also be made according to a process utilizing a p-dihalobenzene, an alkali metal sulfide, an organic amide, and an alkali metal carboxylate as in U.S. Pat. No. 3,919,177.

In a preferred embodiment of the process of the present invention, the alkali metal hydrosulfide is dissolved in the lactam such that the alkali metal hydrosulfide constitutes from about 0.5 to about 25.0 weight percent of the solution.

Presently preferred is sodium hydrosulfide in ε-caprolactam.

The poly(arylene sulfide)-based deposit should be contacted with the solution at a temperature and for a time sufficient to remove said deposits. Generally the contacting should be carried out at a temperature from about 200° C. up to the boiling point of the lactam for a period of time from about 0.5 to about 24 hours.

Preferably, the metal surfaces which contained the deposits are then contacted with a lower alkyl alcohol, such as methanol, to remove the cleansing solution described above. Then the metal surfaces may be further treated by contacting them with water, then dried, followed by contact with concentrated HNO$_3$ in order to remove trace contaminants such as metal oxides.

In another embodiment of the present invention, metal parts having poly(aryene sulfide)-based deposits may be cleaned by contacting the part with a solution consisting essentially of an alkali metal hydrosulfide in a lactam as described in the earlier embodiment of the present invention, thereafter contacting the metal part with a lower alkyl alcohol, washing the metal part with water, drying the metal part, contacting the dried part with concentrated nitric acid and again washing with water and drying.

The following examples illustrate the present invention.

EXAMPLE I

Poly(phenylene sulfide) (PPS) prepared according to U.S. Pat. No. 3,919,177 and having a melt flow between 200 and 400 grams/10 minutes as measured according to ASTM D 1328 modified to a temperature of 315° C. and to the use of a 5 Kg. load was extruded at about 300° C. through a screen pack comprised of 4 stainless steel filter medias (1.56 inches diameter) consisting of one each of 40, 80, and 200 mesh screens placed on top of a Dynalloy X13L filter media (sintered micronic stainless steel fibers). After several hours extrusion, the screen pack was removed and immersed in a solution consisting essentially of 10 weight percent NaSH dissolved in ε-caprolactam at 260° C. for 6 hours. The screen pack was then removed from the solution and washed with methanol to remove any NaSH in ε-caprolactam. The screen pack was then treated with concentrated $HNO_3$ for about 30 minutes at 25° C. to remove trace contaminants. After water rinsing and air drying the screen pack looked exceptionally clean and about 98 weight percent PPS-contaminant had been removed. The cleaning process was repeated using a 10 weight percent NaOH dissolved in caprolactam in one run, caprolactam in another run and 2-pyrrolidone in a third run. None of these last three solutions cleaned the screen pack as good as the NaSH/caprolactam solution. These results are listed in Table I.

Table I

| Effect of Caprolactam-NaSh on Cleaning Metal Screen Packs (Temp 250-260° C., 6 hours) | |
|---|---|
| Cleaning Agent | Results |
| Control: | |
| 1. 2-Pyrrolidone | No cleaning |
| 2. ε-Caprolactam | Good cleaning but lots of microscopic surface trash |
| 3. 3, ε-Caprolactam + 10% NaOH | Good cleaning but some microscopic surface trash |
| Invention: | |
| 4. ε-Caprolactam + 10% NaSH | Good cleaning with only trace of microscopic surface trash |

EXAMPLE II

Poly(phenylene sulfide) (PPS) as described in Example I was extruded as about 300° C. through a filter cartridge commonly used in fiber spinning processes. The filter cartridge (identified as Dynallog X13L) consisted of a 7.5 inches × 1.55 inches O.D. pleated cylinder with an inner and outer stainless steel support screen (equivalent to about a 40 mesh size) and an inner fine filter media comprising sintered micronic stainless steel fibers said media having a 45 micron filter rating. After several hours PPS extrusion operation, the filter cartridge was removed and immersed in a solution consisting essentially of 5 weight percent NaSH dissolved in ε-caprolactam. The immersion was carried out at 250° C. for 16 hours. The filter was then removed, soaked in methyl alcohol for 20 minutes, rinsed with water and air dried. The filter was essentially cleaned with some black particles that were readily removed by gently tapping the cleaned filter on a hard surface. This example illustrates the usefulness of this invention in cleaning other type metal filter screen systems.

Reasonable variations and modifications are possible within the scope of this disclosure without departing from the spirit thereof.

We claim:

1. A process for the removal of poly(arylene sulfide) deposits from metal surfaces comprising contacting said deposits with a cleaning solution, consisting essentially of at least one alkali metal hydrosulfide in a lactam of the general formula

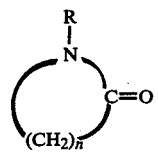

where R is hydrogen or an alkyl radical having from 1 to 5 carbon atoms and n is an integer from 5 to 7 at a temperature and for a time sufficient to remove said deposits.

2. A process according to claim 1 wherein said poly(arylene sulfide) is poly(phenylene sulfide).

3. A process according to claim 1 wherein said solution comprises from about 0.5 to about 25.0 weight percent of sodium hydrosulfide in ε-caprolactam.

4. A process according to claim 1 wherein said contacting is carried out at a temperature from about 200° C. up to the boiling point of said lactam for a period of time from about 0.5 hours to about 24 hours.

5. A process according to claim 1 wherein said metal surfaces are thereafter treated by contacting said surfaces with a lower alkyl alcohol.

6. A process according to claim 5 wherein said metal surfaces are thereafter treated by washing said surfaces with water, drying the metal surfaces, followed by contacting the dried metal surface with concentrated $HNO_3$.

7. A process for cleaning metal surfaces having poly(arylene sulfide) deposits thereon comprising:
   (a) contacting said metal parts with a cleaning solution, consisting essentially of at least one alkali metal hydrosulfide in a lactam of the general formula

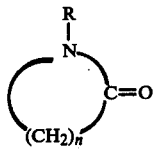

where R is hydrogen or an alkyl radical having from 1 to 5 carbon atoms and n is an integer from 5 to 7 at a temperature and for a time sufficient to remove said deposits;
   (b) thereafter contacting the metal part with a lower alkyl alcohol;
   (c) washing the metal part with water;
   (d) drying the metal part; and
   (e) contacting the dried metal part with concentrated $HNO_3$ followed by water washing and drying.

8. A process according to claim 7 wherein said poly(arylene sulfide) is poly(phenylene sulfide).

9. A process according to claim 7 wherein said solution comprises from about 0.5 to about 25.0 weight percent of sodium hydrosulfide in ε-caprolactam.

10. A process according to claim 7 wherein said contacting is carried out at a temperature above about 200° C. for a time from about 0.5 hours to about 24 hours.

* * * * *